United States Patent
Miyamoto et al.

(10) Patent No.: US 7,119,931 B2
(45) Date of Patent: Oct. 10, 2006

(54) IMAGE READING APPARATUS, IMAGE PROCESSING SYSTEM, IMAGE READING METHOD, AND IMAGE PROCESSING METHOD THAT DETERMINE A DOCUMENT

(75) Inventors: Masayoshi Miyamoto, Kanagawa (JP); Yuichi Araumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1047 days.

(21) Appl. No.: 09/727,757

(22) Filed: Dec. 4, 2000

(65) Prior Publication Data
US 2001/0015828 A1 Aug. 23, 2001

(30) Foreign Application Priority Data
Dec. 8, 1999 (JP) ............................ 11-348366
Feb. 28, 2000 (JP) ............................ 2000-051857
Nov. 27, 2000 (JP) ............................ 2000-359108

(51) Int. Cl.
H04N 1/04 (2006.01)
(52) U.S. Cl. .................. 358/474; 358/448; 358/498
(58) Field of Classification Search ................ 358/498, 358/474, 448, 466, 461, 464, 496, 437–438, 358/440; 345/700
See application file for complete search history.

(56) References Cited

U.S. PATENT DOCUMENTS 5,142,323 A * 8/1992 Iwamoto .................... 399/17
6,822,765 B1 * 11/2004 Ohmori ..................... 358/474

FOREIGN PATENT DOCUMENTS

| JP | 03-010276 | 1/1991 |
| JP | 06-337913 | 12/1994 |
| JP | 11-143907 | 5/1999 |

OTHER PUBLICATIONS

U.S. Appl. No. 09/727,757, filed Dec. 4, 2000, Miyamoto et al.
U.S. Appl. No. 10/802,845, filed Mar. 18, 2004, Araumi.
U.S. Appl. No. 09/727,757, filed Dec. 4, 2000, Miyamoto et al.
U.S. Appl. No. 10/936,585, filed Sep. 9, 2004, Araumi et al.

* cited by examiner

*Primary Examiner*—Thomas D. Lee
*Assistant Examiner*—Heather D Gibbs
(74) *Attorney, Agent, or Firm*—Oblon, Spivak, McClelland, Maier & Neustadt, P.C.

(57) ABSTRACT

An image reading apparatus includes a reading part reading original, a time measuring part being able to measure different times selectively, and a defining part determining separation of sheets of the original read by the reading part. The time measuring part selects a time to be measured according to a predetermined condition, and the defining part determines the separation of sheets of the original when the selected time has elapsed without an operation concerning a subsequent reading operation being performed after a reading operation of the reading part is stopped.

34 Claims, 10 Drawing Sheets

FIG.7

```
                                          132
TOTAL DOCS. 3
DOC. 1 ■ PGS. [copy] [capture] [public] [default]
DOC. 2 __ PGS. [copy] [capture] [public] [default]
DOC. 3 __ PGS. [copy] [capture] [public] [default]
        61      62      63       64      65
```

FIG.8

```
                                          132
USER LIST           SELECT OWNER OF DOC. 1
[user1] [user2] [user3] [user4] [user5]
[user6] [user7] [user8] [user9] [user10]
[PREVIOUS PAGE] [NEXT PAGE]        [FIX]
                                         71
```

IMAGE READING APPARATUS, IMAGE PROCESSING SYSTEM, IMAGE READING METHOD, AND IMAGE PROCESSING METHOD THAT DETERMINE A DOCUMENT

BACKGROUND OF THE INVENTION

1. Field of the Invention

The present invention generally relates to an image reading apparatus, an image processing system, image reading method and image processing method, such as those of a digital copier, a facsimile machine, a scanner or the like, handling image data as electronic information.

2. Description of the Related Art

In the related art, documents (documents in which images and characters/letters are written for which safekeeping should be provided or may be used in future) are in safekeeping in a book shelf or the like after being filed in a form of paper. Recently, as data processing comes to be able to be performed at high speed, and, also, data storage devices come to be reduced in price, a so-called electronic filing apparatus has been put into practice in which documents which should be in safekeeping are read through a scanning device, and are stored in a large-capacity storage device in a form of electronic data.

SUMMARY OF THE INVENTION

However, when using such an electronic filing apparatus, documents to be filed should be read through a scanning device, and such operations are troublesome for a user. Documents to be filed in the electronic filing apparatus are those which are copied through a copier for the purpose of use in a meeting, those which are transmitted to a customer, or the like. Accordingly, the present invention relaters to an electronic filing apparatus by which image data which is once transformed into electric data is used, and image data obtained from the documents through such transformation is transferred into and stored in a storage device.

This transfer of the image data to the storage device is convenient when being re-used in future, if being related into a unit of a series of document handled by inputting of a start command of a photocopying process or the like, rather than as every page of image data. In the related art, in general, relating image data into a unit of document is determined by an input of start command and finish of image reading operation. In this case, in a case where sheets of original are fed through an ADF (Automatic Document Feeder), a document unit can be determined as that fed from the ADF until the sheets of original set in the ADF have run out. However, in a case where a bound document is read sheet by sheet without using the ADF, each page of image data is determined as a document unit.

The present invention has been devised in consideration of the above-mentioned situation, and an object of the present invention is to effectively define documents in image data properly regardless of use of such an ADF.

The present invention comprises:

reading original;

measuring different times selectively; and determining separation of sheets of the original read by the reading part, wherein a time to be measured is selected according to a predetermined condition, and the separation of sheets of the original is determined when the selected time has elapsed without an operation concerning a subsequent reading operation being performed after a reading operation is ended.

Thereby, even in different conditions, the times suitable for the respective conditions are measured, and, thus, it is possible to determine the separation of sheets of the original correctly.

The predetermined condition may comprise a condition of using an apparatus.

Thereby, in different using conditions of the apparatus, the times suitable for the respective conditions are measured, and, thus, it is possible to determine the separation of sheets of the original correctly in any condition of using of the apparatus.

The condition of using the apparatus may comprise a function of the apparatus which is executed by reading the original.

Thereby, in a case where a time interval between reading operations is different for each function of the apparatus, it is possible to determine the separation of sheets of the original properly, by setting different times to be measured accordingly.

The function of the apparatus may be at least one of a facsimile transmission function, a photocopying function and a scanning function.

For example, in a case of scanning, a use of the read image data is limited to be filed, and, therefore, the interval of reading operations is shorter than that in each of the other cases of facsimile transmission and photocopying. Therefore, by setting the shorter time to be measured for the case of scanning accordingly, it is possible to determine the separation of sheets of the original properly at a time of using each function.

The condition of using the apparatus may be either one of a case where an automatic original feeding function is used and a case where the automatic original feeding function is not used and a user manually feeds the original.

There are a case where the automatic original feeding function (automatic original feeding through ADF) is used and a case where the automatic original feeding function cannot be used, for example, in a case where the original is a book, and it is necessary to put each page onto the contact glass turning the page, and the interval of reading operations is different between these cases. In each case, by setting different time to be measured for the different interval of reading operations, it is possible to determine the separation of sheets of the original properly in any case.

The time to be measured is set short in the case where the automatic original feeding function is used but long in the case where a user manually feeds the original.

Thereby, it is possible to set the times to be measured according to the respective cases, and, to determine the separation of sheets of the original properly in any case.

When operation of changing from a condition in which the automatic original feeding function is used to a condition in which the original is fed manually is detected during the measurement of the time of the case of using the automatic original feeding function, it may be determined that the measurement has finished even during the measurement of the time, and that the separation of sheets of the original occurs.

Thereby, even when the interval of reading operations is short, it is determined that the separation of sheets of the original occurs when changing from the automatic original feeding condition to the manual original feeding condition occurs. Accordingly, it is possible to determine the separation of sheets of the original properly.

When an operation (for example, operation of opening/closing the ADF) of again manually feeding the original is detected during measurement of the time of the case of manually feeding the original, the measurement of the time may be re-started.

In the case where the automatic original feeding function is not used, there are a case where the original is scanned with the ADF kept open and a case where the original is scanned with the ADF opened/closed for each page of the original, and the interval of reading operations is different between these cases. Specifically, the interval of reading operations is longer in the case where the ADF is opened/closed for each page of the original. In this case, by re-starting the measuring the time each time the ADF is opened/closed, it is possible to avoid determining the separation of sheets of the original erroneously, and to perform the determination of the separation of sheets of the original properly.

Measurement of the time may be stopped by a predetermined operation.

Thereby, in a case, for example, it is found that some pages of the original are stapled, and the staples are removed at the time, and, thereby, a user wants to stop measuring the time, it is possible to stop the measurement of the time by pressing a predetermined operation switch or the like, for example. Accordingly, it is possible to avoid erroneously determining the separation of sheets of the original, and to perform the determination of the separation of sheets of the original properly.

The present invention may further comprise previously registering, for the original to be read, as a plurality of documents, and image data read from the original may be treated as respective ones of the plurality of documents registered.

Thereby, even in a case where, for example, a plurality of documents are read at once, and, thereby, the interval of reading operations is short even between different documents, it is possible to determine the separation of documents correctly in accordance with intention of a user by previously registering for the documents. Furthermore, in a case where both the original read in using the automatic original feeding function is used and other original read in not using the automatic ordinal feeding function but turning each page are intended to be included in one document, and the interval of reading operations is long, it is possible to not determine the separation of documents correctly in accordance with intention of a user by previously registering for the documents.

Registering of document information may be performed for each of the plurality of documents, and adds the document information to the image data for each document.

Thereby, at a time of re-using the image data, it is possible to use various search keys for searching the documents, and it is possible to improve using efficiency of the electronic filing system.

The document information may comprise at least one of a reading condition, user information and storage information.

Thereby, at a time of re-using the image data, it is possible to use such information as a search key for searching the stored documents, and it is possible to improve using efficiency of the electronic filing system.

The present invention may further comprise displaying the contents registered during the reading operation.

Thereby, it is possible to view the registered contents at a desired time, and to avoid erroneous processing before occurring.

The present invention may further comprise displaying the contents registered after the reading operation, and confirming/editing the registered contents viewing them displayed.

Thereby, it is possible to correct the registered contents viewing them, and, thereby, to set the correct contents.

Treating one or a plurality of sheets of original as one document, the present invention may comprise displaying contents comprising separation of sheets of the original automatically determined, as temporary registered contents, and confirming/editing the temporary registered contents viewing them displayed.

Thereby, it is possible to reduce operations by a user to register for the documents, and, also, to finally register the correct contents.

Registering document information for each document of the plurality of document, and adding the document information to the image data for each document may be performed.

Thereby, at a time of re-using the image data, it is possible to use various search keys for searching the documents, and it is possible to improve using efficiency of the electronic filing system.

The document information may comprise at least one of a reading condition, user information and storage information.

Thereby, at a time of re-using the image data, it is possible to use such information as a search key for searching the stored documents, and it is possible to improve using efficiency of the electronic filing system.

Another aspect of the present invention treats one or a plurality of sheets of original as one document, and comprises displaying contents comprising separation of documents determined by a predetermined method, as temporary registered contents, and confirming/editing the temporary registered contents viewing them displayed.

Thereby, it is possible to reduce registering operations performed by a user, and, also, to finally register the correct contents.

Registering document information for each document of the plurality of document, and adding the document information to the image data for each document may be performed.

Thereby, at a time of re-using the image data, it is possible to use the document information as a search key for searching the documents, and it is possible to improve using efficiency of the electronic filing system.

The document information may comprise at least one of a reading condition, user information and storage information.

Thereby, at a time of re-using the image data, it is possible to use such information as a search key for searching the documents, and it is possible to improve using efficiency of the electronic filing system.

Another aspect of the present invention treats one or a plurality of sheets of original as one document, and comprise previously registering, for original to be read, as a plurality of documents, and reading the original, wherein image data obtained by the reading part is treated for each document of the plurality of documents registered.

Thereby, even in a case where, for example, a plurality of documents are read at once, and, thereby, the interval of reading operations is short even between different documents, it is possible to determine the separation of documents correctly in accordance with intention of a user by previously registering for the documents. Furthermore, in a case where both the original read in using the automatic original feeding function is used and other original read in not using the automatic ordinal feeding function but turning each page are intended to be included in one document, and the interval of reading operations is long, it is possible to not determine the separation of documents correctly in accordance with intention of a user by previously registering for the documents.

Registering of document information may be performed for each of the plurality of documents, and adds the document information to the image data for each document.

Thereby, at a time of re-using the image data, it is possible to use various search keys for searching the documents, and it is possible to improve using efficiency of the electronic filing system.

The document information may comprise at least one of a reading condition, user information and storage information.

Thereby, at a time of re-using the image data, it is possible to use such information as a search key for searching the documents, and it is possible to improve using efficiency of the electronic filing system.

The present invention may further comprise displaying the contents registered during the reading operation.

Thereby, it is possible to view the registered contents at a desired time, and to avoid erroneous processing before occurring.

The present invention may further comprise displaying the contents registered after the reading operation, and confirming/editing the registered contents viewing them displayed.

Thereby, it is possible to correct the registered contents viewing them, and, thereby, to set the correct contents.

Another aspect of the present invention treats one or a plurality of sheets of original as one document, and comprise reading the original, registering, for image data obtained from original by the reading part, as a plurality of documents, wherein the image data obtained by the reading part is treated for each document of the plurality of documents registered.

Thereby, even in a case where, for example, a plurality of documents are read at once, and, thereby, the interval of reading operations is short even between different documents, it is possible to determine the separation of documents correctly in accordance with intention of a user by registering for the documents after the reading operations. Furthermore, in a case where original read in using the automatic original feeding function is used and other original read in not using the automatic ordinal feeding function but turning each page are intended to be included in one document, and the interval of reading operations is long, it is possible to not determine the separation of documents correctly in accordance with intention of a user by registering for the documents after the reading operations.

Registering of document information may be performed for each of the plurality of documents, and adds the document information to the image data for each document.

Thereby, at a time of re-using the image data, it is possible to use various search keys for searching the documents, and it is possible to improve using efficiency of the electronic filing system.

The document information may comprise at least one of a reading condition, user information and storage information.

Thereby, at a time of re-using the image data, it is possible to use such information as a search key for searching the documents, and it is possible to improve using efficiency of the electronic filing system.

Another aspect of the present invention comprises storing image data for which separation of sheets of original is already determined obtained as described above, as particular documents obtained from the separation of sheets of original.

Thereby, at a time of re-using the image data, it is possible to search the image data for each document, and to improve the using efficiently of the electronic filing system.

The present invention may further comprise transmitting the image data for which separation of sheets of original is already determined obtained as described above, as particular documents obtained from the separation of sheets of original, to be stored.

Thereby, because it is possible to transmit the image data in units of documents, it is possible to store the image data in units of documents. Accordingly, it is possible to search the image data for each document, and, thus, to improve the using efficiently of the electronic filing system.

This transmission of the image data may be performed via a network.

Thereby, it is possible to transmit the image data remotely, and, thereby, it is possible to re-use the image data efficiently.

This transmission of the image data may be performed via a facsimile transmission system.

Thereby, it is possible to transmit the image data remotely, and, thereby, it is possible to re-use the image data efficiently.

Other objects and further features of the present invention will become more apparent from the following detailed description when read in conjunction with the accompanying drawings.

BRIEF DESCRIPTION OF THE DRAWINGS

FIG. 7 shows a first example of a setting picture of the LCD of the operation panel;

FIG. 8 shows a second example of the setting picture of the LCD of the operation panel;

DETAILED DESCRIPTION OF THE PREFERRED EMBODIMENTS

A first general aspect of the present invention is to determine document separation by time-out.

However, in this case, there is a difference in time required for exchanging of sheets of original between a case where an ADF is used and a case where a user sets each sheet of the original onto a contact glass through opening and closing of the ADF. Accordingly, when the same time-out time is used for the determination, it is difficult to determine separation of documents properly. When the time-out time is too long, a document of a user is erroneously determined as the same document of a preceding user. In order to avoid such a situation, according to the first general aspect of the present invention, different time-out times are set for a case of using the ADF and a case where a user sets a document on the contact glass sheet by sheet, for determining separation of documents.

Specifically, the time-out time for a case where a user sets a document on the contact glass sheet by sheet is made longer than the time-out time for a case of use of the ADF. Thereby, in the case where the user sets a document on the contact glass sheet by sheet, image data obtained through a series of copying operation is treated as a document in consideration of a time required for the user to re-set a sheet of document onto the contract glass.

Further, by detecting opening/closing of the ADF, it is possible to properly determine document separation even when photocopying operation is changed from one using the ADF to one without using the ADF.

Furthermore, in a case of not using the ADF, document separation is properly made by considering an operation time required for opening/closing of the ADF when photocopy is made by opening/closing of the ADF for each sheet of document.

Figure 1:
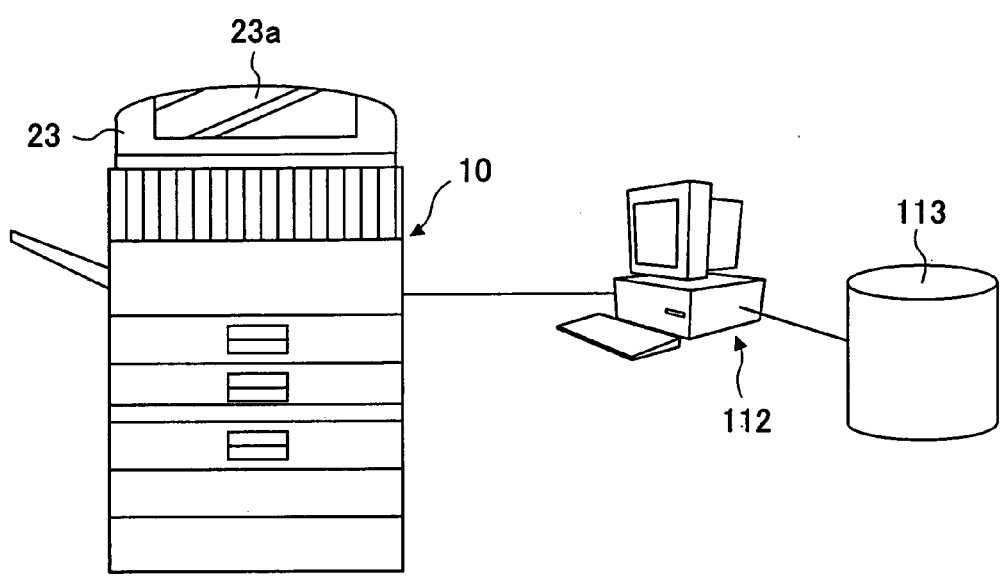
FIG. 1 shows an entire configuration of an electronic filing system according to the present invention.

FIG. 1 shows an entire configuration of an electronic filing system according to the present invention.

In this filing system, a high-function digital copier (MFP: Multi-Function Printer) 10 is used in a business division in common, for example, and, to the MFP 10, a server apparatus 112 configured of a personal computer (PC) and a large-capacity storage device (IMS; Infinite Memory Server) 113 are connected. Image data once processed by a user through the MFP 10 is then sent to the server apparatus 112, and is stored in the IMS 113 therethrough in a manner such as to be able to be searched for and read out. Thereby, the processed image data is filed re-usably in the filing system. The MFP 10 has an ADF 23 having an original table 23a mounted on the top thereof, as shown in the figure.

Figure 2:
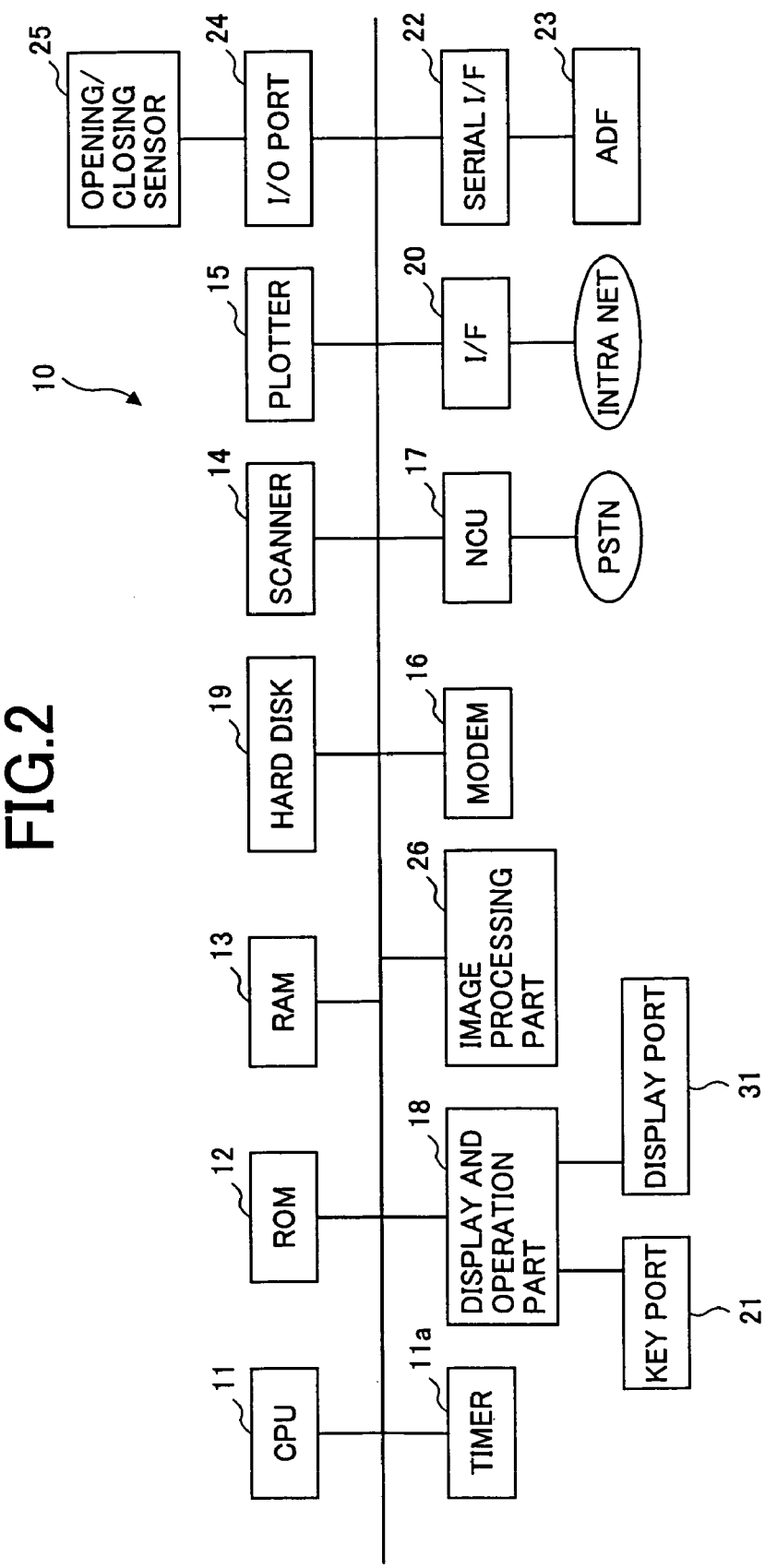
FIG. 2 shows a general configuration illustrating one example of a digital copier according to the present invention.

FIG. 2 shows an internal block configuration of the above-described digital copier (MFP) 10.

In the MFP 10, a CPU 11 reads control programs previously stored in a ROM 12, and controls respective parts of the MFP 10 using a RAM 13 as a work area for temporarily storing image data and/or sensor signals. Thereby, the MFP 10 performs various operations as a data processing apparatus, and, also, to perform operations according to the present invention.

To the MFP 10, the above-mentioned server apparatus 112, which stores data in the above-mentioned large-capacity storage device 113 and manages the data in a manner in which the stored data can be searched for and read is connected through a network I/F (interface) 20. Then, as described above, image data once dealt with by a user is then transferred by the MFP 10 to the server apparatus 112 whether or not transfer instructions are given, and, thereby, the image data having been dealt with is filed (stored in safekeeping). Thus, the filing system is constructed as mentioned above.

The server apparatus 112 may not be connected to the MFP 10 through the network but may be connected thereto directly.

In the MFP 10, the ROM 12, RAM 13 and network I/F 20 are connected to the CPU 11 via a system bus, and, also, a scanner 14, a plotter 15, a modem 16, an NCU (Network Control Unit) 17, an operation unit 18, a hard disk drive 19, a serial I/F 22 and an I/O port 24 are connected to the CPU 11 via the system bus. Then, as a result of the CPU 11 unifyingly controlling those respective parts 12 through 18 of the MFP 10, the scanner 14 functions as an image reading device, and, thereby, the MFP 10 can be used as a copier which has a transmission function of transmitting image data through facsimile communication, a copying function of outputting so as to record read image data and a recording function of outputting so as to record received image data.

Further, the MFP 10 has a timer 11a which is used by the CPU 11 when the CPU 11 controlling respective parts of the MFP 10. For example, the timer 11a is used for counting timing pulses for synchronizing the respective parts of the MFP 10.

The MFP 10 may also be used as a printer which outputs so as to record image data which has been received from a PC (personal computer), or a scanner which reads in image data and sends the image data to a PC. Such image data may be caused to undergo operations the same as those which are performed on image data according to the present invention.

The above-mentioned ADF 23 communicates with the CPU 11 information such as a paper end alarm, a paper jam alarm and so forth, and, also, an opening/closing sensor 25 which detects opening/closing of the ADF 23 is connected to the CPU 11 through the I/O port 24.

Simply describing, after sheets of original set on the original table 23a of the ADF 23 are separately fed through the ADF 23 sheet by sheet and are positioned onto a contact glass (reading position), for example, the scanner 14 applies light from an exposure lamp onto the original (document comprising images, characters/letters and/or the like) placed on the contact glass, converts the light reflected by the image surface of the original into an electric signal, and, thus, reads the image data, according to a well-known reading method.

The plotter 15 optically writes, from image data read/received and then latched in the RAM 13, an electrostatic latent image onto a rotated and charged photosensitive body, forms a toner image therefrom by causing toner to adhere thereto, transfers the toner image onto a paper sheet fed from a paper feeding cassette, fixes it onto the paper sheet, and ejects it, according to a well-known electrophotographic recording method, for example.

The modem 16 modulates/demodulates image data and various procedure signals, the NCU 17 performs connection or disconnection of a line by performing line control with a PSTN (Public Switched Telephone Network), and, thereby, transmits/receives facsimile data to/from a facsimile terminal at the other end.

The MFP 10 may have an image processing part 26 which functions as a DCR coding and compressing image data, and, then, decoding and decompressing the image data for reproduction thereof. Further, the MFP 10 can perform image processing such as enlargement/reduction in size of an image in a size-changing rate according to instructions input by a user at a time of photocopying.

The operation unit 18 includes a key port 21 and a display port 31 provided in an operation port provided at a top on a front surface of a body of the MFP 10. The key port 21 includes a start key for inputting instructions of starting copying operation and so forth. The display port 31 includes a display and operation LCD (Liquid Crystal Display) with a touch panel, through which various information such as driving conditions, states of the MFP 10, input conditions and so forth are displayed, and selection of functions, various setting and so fourth are input by operation performed by a user.

Further, the CPU 11 of the MFP 10, for example, outputs so as to record image data obtained as a result of original being read through the scanner 14 onto a paper sheet through the plotter 15, or transmits image data through the modem 16 and NCU 17, and, in parallel, stores the same image data with document information added thereto such as processing date/time information, the number of pages, telephone number of the other end, and/or the like in the hard disk drive 19. Then, the CPU 11 performs transfer operation of sending the image data to the above-mentioned server apparatus 112 via the network I/F 20.

The server apparatus 112 connected to the MFP 10 will now be described. This apparatus 112 may be configured by a general-purpose personal computer (PC) as mentioned above. Through this apparatus, a user can perform various processing such as producing documents or images, through an operation process, by operating a keyboard and/or a mouse, viewing a display device. Similarly, through the server apparatus 112, a user can store and manage image data transferred from the MFP 10 in the large-capacity storage device 113, re-usably, by searching for and reading the image data, and displaying/outputting so as to record the image data. Specifically, image data is stored in the large-capacity storage device 113 for each document dealt with continuously in a manner in which each document is related to respective document information. Then, in response to a request by a user, a part (thumbnail image on the top page, or the like, for example) of each document is displayed on the display device in a form of calendar or the like selectable based on a processing date/time or the like. Thereby, the user can read image data selected therefrom in a unit of document from the large-capacity storage device 113, output so as to record the thus-read image data by sending to the MFP 10, for example, recognize the contents of the displayed image data, and, thus, re-use the image data.

Further, it is also possible to enable outputting so as to display image data in a unit of document on the display device in sequence, and, to enable modifying the image data in a form of electronic data through the PC, and, thus, enable re-using the image data.

Figure 3:
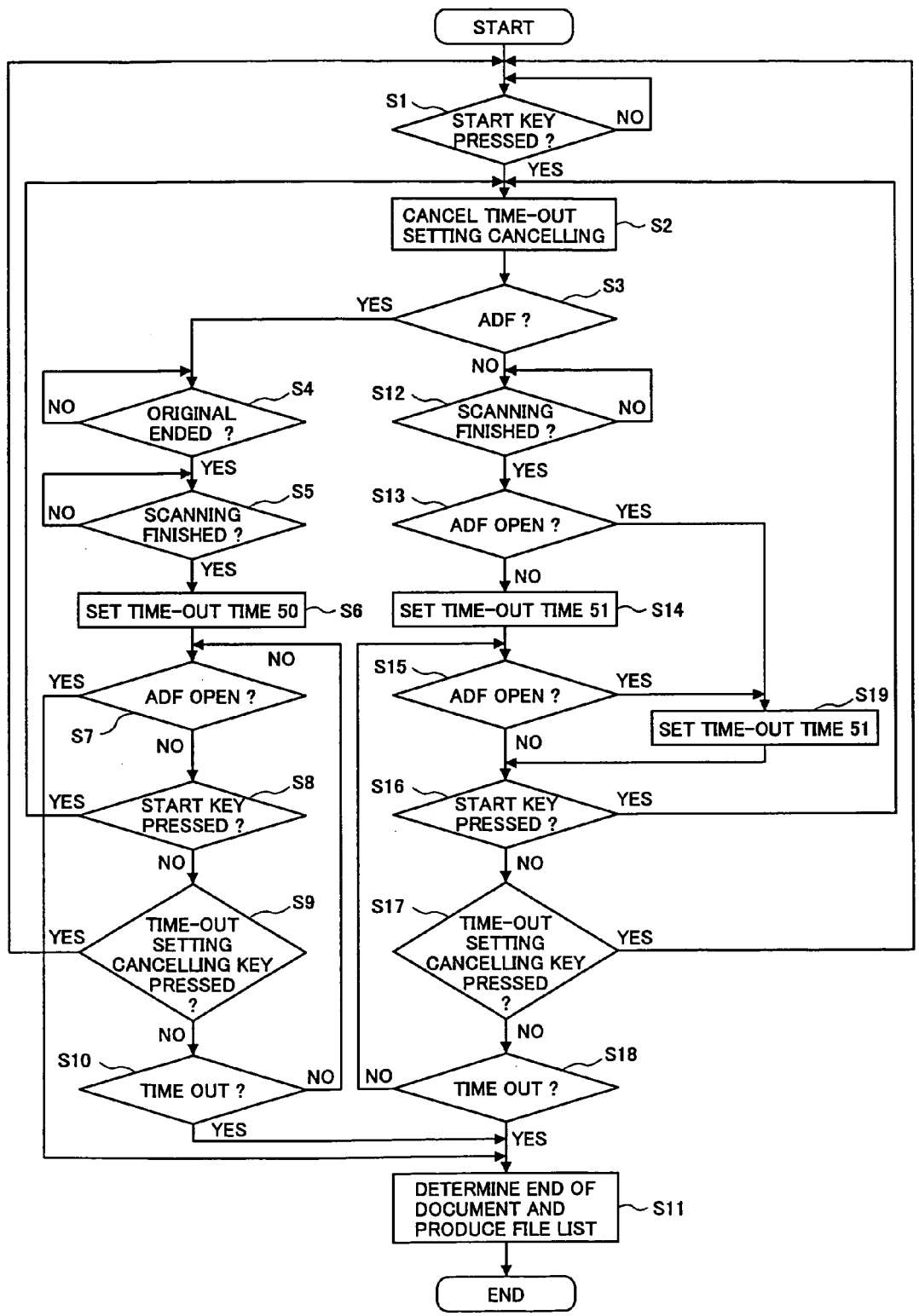
FIG. 3 shows a flow chart illustrating operations according to a first general aspect of the present invention.

With reference to FIG. 3, a photocopying operation, for example, according to the first general aspect of the present invention will now be described. The photocopying operation is started by the start key of the key port 21 being pressed by a user (in a step S1), and, through a step S3, sheets of original is placed on the ADF 23, original feeding is performed by the ADF 23 when the ADF 23 is previously closed, but the ADF 23 is stopped otherwise.

In the case of photocopying process using the ADF 23 (YES on the step S3), after it is determined (in step S4) that all the sheets of original placed on the ADF 23 have been fed to the contact glass and scanned through the scanner 14 (in a step S5), the CPU 11 sets a time-out time 50 to the timer 11a (in a step S6). Simultaneously, the timer 11a starts counting-down operation. Then, when the time out occurs, that is, the timer 11a has finished counting of the time-out time 50 (YES in a step S10), the CPU 11 recognizes that the document has ended. Then, the CPU 11 produces a file list of the copied image data, and transfers the image data to the server apparatus 112 (in a step S11).

When the start key is pressed before the time out occurs (YES in a step S8), the step S3 is again executed, image data is input through scanning and is treated as the same document, and the process is repeated.

However, when the opening of the ADF 23 is detected through the opening/closing sensor 25 during waiting for occurrence of the time out (YES in a step S7), the waiting for occurrence of the time out is cancelled, a file list of image data obtained through the photocopying operation is produced, and the image data is transferred (in the step S11).

Furthermore, when a time-out setting canceling key provided in the key port 21, for example, is pressed by the user during waiting for occurrence of the time out (YES in a step S9), the step S1 is executed again, and, the start key being pressed (YES in the step S1) is waited for. When the start key is pressed, the effect generated due to the time-out setting canceling key being pressed is cancelled, and, the process same as that described above is executed.

This time-out setting canceling key is used, for example, as follows: when a user does not intend to cause the time out to occur while the user unbinds a bound document.

In a case where a photocopying operation is performed without using the ADF 23 (that is, a user manually opens the ADF 23, places a sheet of original onto the contact glass, and takes a photocopy thereof), after the step S3 (NO of the step S3), opening/closing of the ADF 23 is detected in a step S13 after the end of scanning operation performed by the MFP 10 (YES of a step S12). Then, when the ADF 23 is opened (YES in the step S13), a time-out time 51 is set in a step S19, then, after occurrence of the time out (YES in a step S18) or the start key is pressed (YES in a step S16), a file list of the image data obtained through the photocopying operation is produced, and the image data is transferred (in the step S11), or the photocopying operation is continued (starting from the step S3).

Further, same as the above mention, when the time-out setting canceling key is pressed (YES in a step S17), the step S1 is again executed, and the starting key being again pressed is waited for.

When it is detected in the step S13 that the ADF 23 is closed (NO), the time-out time 51 is set in a step S14 once, and occurrence of the time out is waited for. However, when the ADF 23 is opened in this condition (YES in a step S15), the time-out time 51 is again set (in the step S19), and thus, the time-out time is substantially extended.

Thus, although there is a difference in time required for setting each sheet of original occurring due to a difference as to whether or not the ADF 23 is used for feeding the original, it is possible to determine that a document has ended properly by setting the different time-out times for the respective cases. In the case where the ADF 23 is not used, when opening/closing operation of the ADF 23 is detected, the time-out time is set again so as to substantially extend the time-out time. Accordingly, it is possible to determine that a document has ended properly in each of a case where photocopying operation, for example, is continued with repetition of the opening/closing operations, and a case where photocopying operation, for example, is continued with the ADF 23 kept opened. Further, in the case where the ADF 23 is used, determination that a document has ended can be made when a form of the original has changed as a result of opening/closing operation of the ADF 23 performed due to the occurrence of the change in the form of the original being detected. However, when opening/closing operation of the ADF 23 is performed due to a reason that an event other than normal operation such as paper jam or the like occurs in the ADF 23, determination that a document has ended is prevented from being made.

Thus, the time-out time, which is an interval of reading operations, for determining that a document has ended is suitably set to the time-out time 50 for the case where the ADF 23 is used, and, also, to the time-out time 51 for the case where a user sets each sheet of original onto the contact glass (or the original table) sheet by sheet, for which two cases a time required for replacing each sheet of original is different. Thereby, it is possible to appropriately determine an end of a document whether or not the ADF 23 is used.

Specifically, by setting the time-out time 51 for the case where a user sets an original onto the contract glass (or the original table) sheet by sheet longer than the time-out time 50 for the case where the ADF 23 is used, it is possible to determine an end of a document in consideration of a time required for a user to replace each sheet of a document and position the sheet.

Furthermore, it is possible to recognize an end of a document by detecting opening/closing the ADF 23 during use of the ADF 23, even in a case where photocopying process is changed from one using the ADF 23 into one not using the ADF 23.

Furthermore, in the case where a user performs photocopying operation without using the ADF 23, there may be a case to perform the photocopying operation with opening and closing the ADF 23, and a case to perform the photocopying operation with the ADF 23 kept opening. Then, by taking into account of a time required for a user to perform opening/closing operation of the ADF 23 in the case where photocopying operation is performed with the opening/closing operation of the ADF 23, it is possible to determine an end of a document appropriately.

A second general aspect of the present invention will now be described.

In a case where original which has been read in is stored as one document as described above, there may be a case where a reading condition is changed for the same document, and a case where, in the same document, the original which is read through the ADF 23 and the other original which is read by turning page by page are mixed. In such a case, while the condition is changed, a time elapsed, and, thereby, an end of a document may be determined unexpectedly when only a time is used for the determination. Further, in a case where a plurality of documents are read in a same setting, when a different document is read within the time-out time, this document may be unexpectedly determined as the same document with the precedingly read document.

In order to solve such problems, for achieving a suitable determination of an end of a document even in such cases, it is made possible to set document information such as the number of sheets, a reading condition, user information, storage information and so forth, for each document, before the original is read in. Thereby, it is possible to determine an end of a document positively, and, to improve accuracy in searching and reading stored image data after that.

For this purpose, before a reading process, for a plurality of documents, document information such as the number of sheets, a reading condition, user information, storage information and so forth is set for each document, then, after the reading process, the thus-set document information is added to the thus-read-in image data, and, then, the image data can be sent to the storage device in desired units of documents.

Thereby, it is possible to improve an accuracy in searching and reading of documents in an electronic filing system after that.

The image reading apparatus may be used not only in a copier or a facsimile machine but also as a scanner device by itself.

Further, in the above-described configuration, it is made possible that, during the reading process or after the reading process, a difference in process contents is detected, and, thereby, determination of an end of a document is made automatically, and, then, after the reading process, the determination result is displayed, and is confirmed and edited if necessary. Thereby, when no correction is needed, the read image data is stored in the storage device with the information as to the separation of sheets of the original as it is . However, when some correction is needed, a document for which the correction should be made is selected, and the document information thereof such as the determination of the end of the document is appropriately corrected. Accordingly, a load on a user for a setting operation can be reduced. Thus, the automatically set document information is displayed after the reading process, and correction is made for each document for which the document information should be corrected if necessary, and the thus-corrected document information is added to the image data, and the thus-obtained image data can be sent to the storage device in desired units of documents. Thereby, it is possible to make easier high-accuracy document registration process in the electronic filing system.

A configuration of the electric filing system according to the second general aspect of the present invention can achieve the above-described objects. The electronic filing system according to the second general aspect of the present invention includes, in addition to the configuration and functions described above with reference to FIGS. 1, 2 and 3, the features which will now be described (However, the document separation function using the time-out time according to the first general aspect of the present invention described with reference to FIG. 3 may be excluded from the electronic filing system according to the second general aspect of the present invention).

Figure 4:
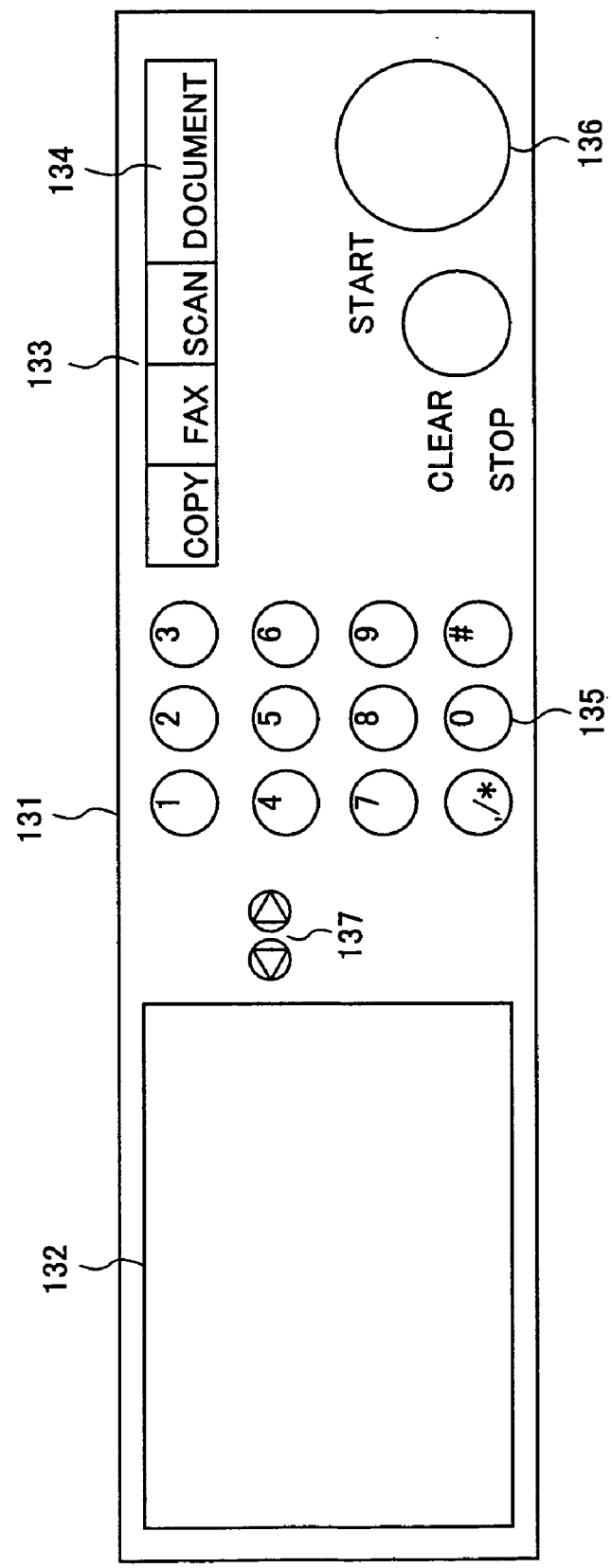
FIG. 4 shows a layout of an operation panel of the digital copier shown in FIG. 1.

FIG. 4 shows a layout of an operation panel of the display and operation part 18. The operation panel 131 includes the LCD (display port 31), function selection keys 133 including a document key 134, ten keys 135, the start key 136, arrow keys 137 and so forth (key port 21).

In FIG. 2, as mentioned above, to the CPU 11, the NCU (Net Control Unit) 17 is connected for performing the predetermined line control, line connection and disconnection when calling/call acceptance is performed via the PSTN (Public Switched Telephone Network). Then, the CPU 11 performs modulating/demodulating image data and various procedure signals through the modem 16 and performs facsimile communications (transmission/reception) through the NCU 17, and, also, transmits image data read in from original through the scanner 14 to the server apparatus 112 directly or via the network through the interface 20.

The ADF 23 is mounted on the contact glass removably (openably) on the MFP 10, by which sheets of original set on the original table 23a shown in FIG. 1 are fed and positioned onto the contact glass (at a reading position thereof) sheet by sheet separately, and, after being read, the original is carried out to a paper ejecting table.

By a feeding mode in which original is automatically fed through the ADF 23, or a placement mode in which, after book-like original or a sheet-like original is placed on the contact glass, the top surface of which is exposed as a result of the ADF 23 being opened, the ADF 23 is used as a pressing plate, the original is placed on the contact glass. Then, the scanner 14 reads in image data to be transmitted/copied from the original.

As mentioned above, the original image may be read in by a well-known reading method. For example, light is applied by the exposure lamp to the original positioned on the contact glass, and the light thus reflected by the original is transformed into an electric signal through a CCD, and, thus, the image data is read in.

The plotter 15 records image data which has been read in/received and stored in the RAM 13 in a form of a bit map onto a paper sheet through a well-known electrophotographic recording method, for example. Specifically, based on the image data read in/received, optical writing is performed on the rotating photosensitive body, the surface of which is uniformly charged, and, thereby, an electrostatic latent image is formed on the photosensitive body. Then, toner is caused to adhere to the electrostatic latent image, and thus, development is performed. The thus-formed toner image is transferred and fixed onto a sheet fed from a paper feeding cassette. The thus-obtained sheet with the image is ejected from the apparatus.

Other than the electrophotographic recording method, another method, such as an ink-jet method, a thermal-head method, a dot-impact method or the like may be employed by the plotter 15.

As mentioned above, the CPU 11 functions as a DCR (coding/decoding) compressing and coding image data to be transmitted, and, also, decompressing and decoding received image data, and, also, performs image processing such as changing a size of an image into a desired size according to instructions by a user on image data.

Accordingly, the MFP 10 has a transmission function of transmitting image data through facsimile communications, a photocopying function of recording and outputting read image data and a recording function of recording and outputting received image data. Thus, the MFP 10 can be used as not only a copier but also a facsimile machine.

Also, it is possible that the MFP 10 may be configured to be able to be used as a printer which receives image data from a PC and records so as to output it, or a scanner device which sends read image data to a PC. The thus-obtained image data may also be used as image data processed according to the present invention.

Figure 5:
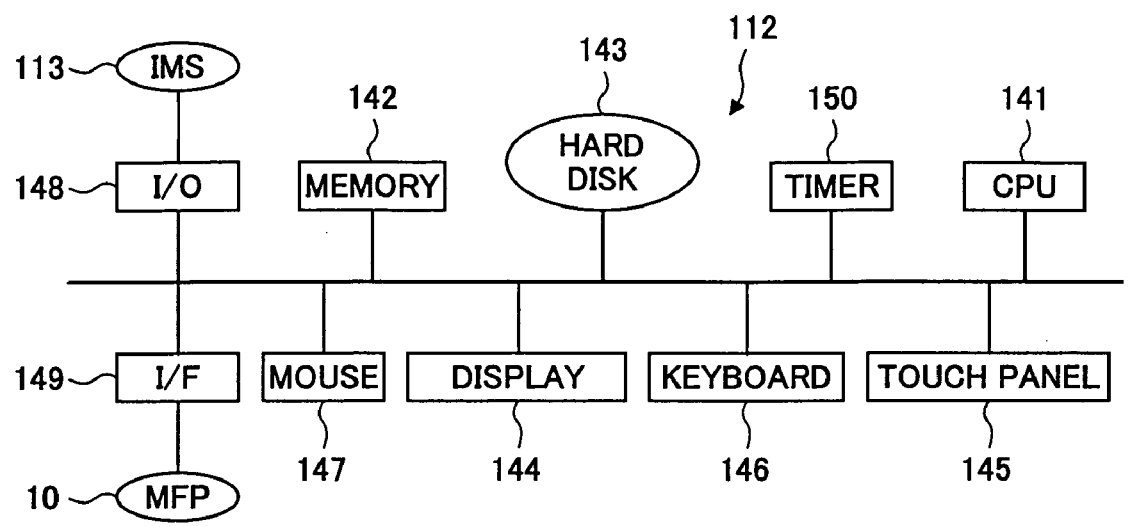
FIG. 5 shows a functional block diagram of a server apparatus shown in FIG. 1.

FIG. 5 shows a functional block diagram of the server apparatus 112. The server apparatus 112 includes a CPU 141, a memory (ROM, RAM, and so forth) 142, a hard disk drive 143, a display device 144, a touch panel 145, a keyboard 146, a mouse 147, an I/O circuit 148, an I/F circuit 149, and a timer function device 150. Through the server apparatus 112, a user, viewing the display device 114, operates the keyboard 146 and/or mouse 147, and, thereby, performs operation processing according to an application program read out from the hard disk drive 143. Thereby, it is possible to use the server apparatus 112 as a system of processing various processes such as producing documents and/or images.

Further, it is possible to use the server apparatus 112 as a server of an electronic filing system as a result of data being transmitted to/received from the IMS 113 connected via the I/O circuit 148 and the MFP 10 connected via the I/F circuit 149.

The server apparatus 112 receives image data same as that processed in the MFP 10 via the I/F circuit 149, and sends the image data to the IMS 113 (storage device) which then stores the image data therein. Specifically, the server apparatus 112 receives document information sent from the MFP 10, distinguishes the image data to be processed successively into particular documents, and, thereby, stores in safekeeping the image data in the IMS 113 in a manner such that it is possible to identify the stored image information for each document, or for each user who uses the MFP 10.

Then, as mentioned above, the server apparatus 112, in response to a request by a user, reads out a part (for example, a thumbnail of the top page) of each document stored in the IMS 113 based on added data (document information) such as a processing date/time for each user and for each document, and displays on the display device 114 in a calendar form or the like. Then, when the user selects image data therefrom, the server apparatus 112 reads it from the IMS 113 in units of documents, and transfers it to the MFP 10. Then, for example, it is possible for the user to cause the contents of the image data to be recorded so as to be output, through the MFP 10, for example, and, thereby, to confirm the contents, and, thus, to re-use the image data.

Furthermore, it is also possible that image data in units of documents is displayed on the display device 144 successively, then, the image data in a form of electric data is modified, and, thus the image data can be re-used.

The MFP 10 is configured such that the CPU 11 performing various processes according to the present invention displays a picture for registering for a plurality of documents to be processed on the LCD 132 of the display and operation part 18 shown in FIG. 4, any thereof is selected by a user, and, for the selected document, document information such as processing contents, owner information and so forth can be input by the user. Then, the CPU 11 makes a control such that the above-mentioned document information is added to image data read in photocopying operation or facsimile transmission operation performed after this setting (input of the document information) for each document so that the image data can be stored in the IMS 113 in units of documents.

The method of indicating the separation of documents is not limited to adding the document information mentioned above. For example, it is also possible to control an interval of transmission of image data, and so forth.

Specifically, for example, a case where a plurality of documents are copied through the MFP 10 will now be described.

Figure 6:
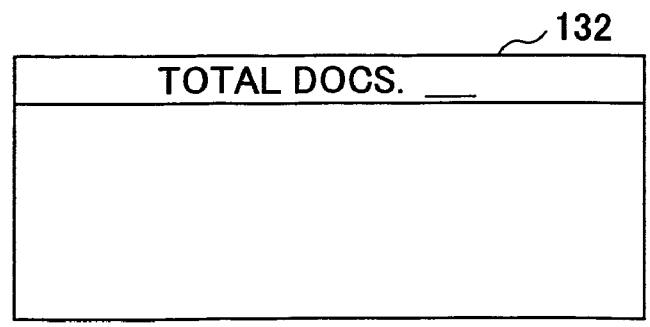
FIG. 6 shows a first example of an initial picture of an LCD of the operation panel shown in FIG. 4.

A plurality of sheets of each document is set on the original table 23a of the ADF 23, and the document key 134 of the function selection keys 133 of the operation panel 131 is pressed. Then, the document setting picture shown in FIG. 6 is displayed on the LCD 132. Then, using the ten keys 135, the total number of the documents to be processed is input. Then, default settings for documents, the number of which has been thus input are displayed as shown in FIG. 7. Then, for each document, the document information such as the number of sheets, processing contents, storage denial instructions, publication instructions, owner and so forth is set. In the initial picture of the document setting picture, a cursor 61 appears. At the position at which the cursor 61 is located, the number of sheets is input using the ten keys 135.

The method of display is not limited to the switching between displays of the reading operation picture shown in FIG. 4 and the registering picture shown in FIG. 7. It is also possible that the LCD 132 includes two display regions, and these two pictures are displayed at the same time thereby, for example.

The above-mentioned processing contents are contents of processing such as copying processing, facsimile transmission processing, scanning processing or the like which the MFP 10 performs. A processing content key 62 in the document setting picture is touched and desired processing contents are selected using the function selection keys 133. For example, when a copying function is used and thus the COPY key of the keys 133 is pressed, a copying condition setting picture is displayed on the LCD 132. Then, after various settings are made, the document key 134 is pressed. Then, the document setting picture is again displayed on the LCD 132.

A storage denial instruction key 63 displays 'capture' (storage) in default, as shown in FIG. 7. When this key is touched, it then displays 'non-capture' (storage denial). When the storage denial is set and registered, the relevant document is not stored.

A publication instruction key 64 displays 'public' (publication) in default. When this key is touched, it then displays 'non-public' (not publication). When the publication is set and registered, a right to search for and read the relevant document is given to all the users.

The owner is a user who only has the right to search for and read a document stored in the IMS 113, unless the above-mentioned publication is set, and can be set for each document. In the initial picture, an owner specification key 65 displays 'default' (default user) as shown in FIG. 7. When this key is touched, a user list shown in FIG. 8 is displayed on the LCD 132. Then, a user or users to which the right to search for and read out of a document is selected therefrom, and then, when a fix key 71 is touched, the document setting picture shown in FIG. 7 is again displayed.

Figure 9:
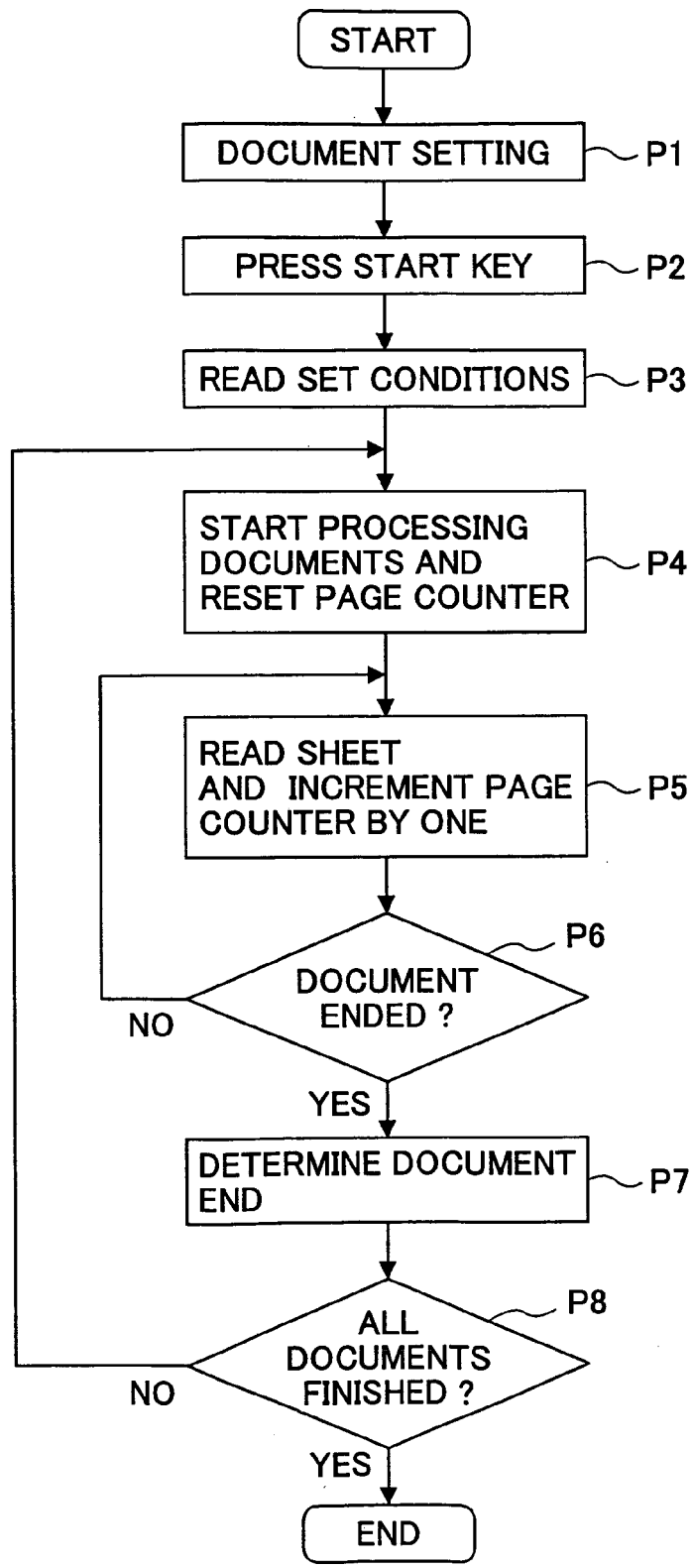
FIG. 9 shows a flow chart illustrating operations according to a second general aspect of the present invention.

As shown in a flow chart shown in FIG. 9, when the start key 136 is pressed (in a step P2) after the document setting described above with reference to FIGS. 7 and 8 is performed in a step P1, the CPU 11 reads the thus-set document set conditions in a step P3. Then, the CPU 11 starts processing for the first document.

Then, a page counter for counting the number of sheets for a document is reset to 0, the first sheet is read through the ADF 23, and the page counter is incremented by one in a step P5. In a step P6, it is determined whether or not the number of sheets specified in the document setting picture is equal to value of the page counter. When it is equal, it is determined that the document has finished, and, then, a step P7 is performed. When it is not equal, the step P5 is executed again, and reading is performed again.

Figure 10:
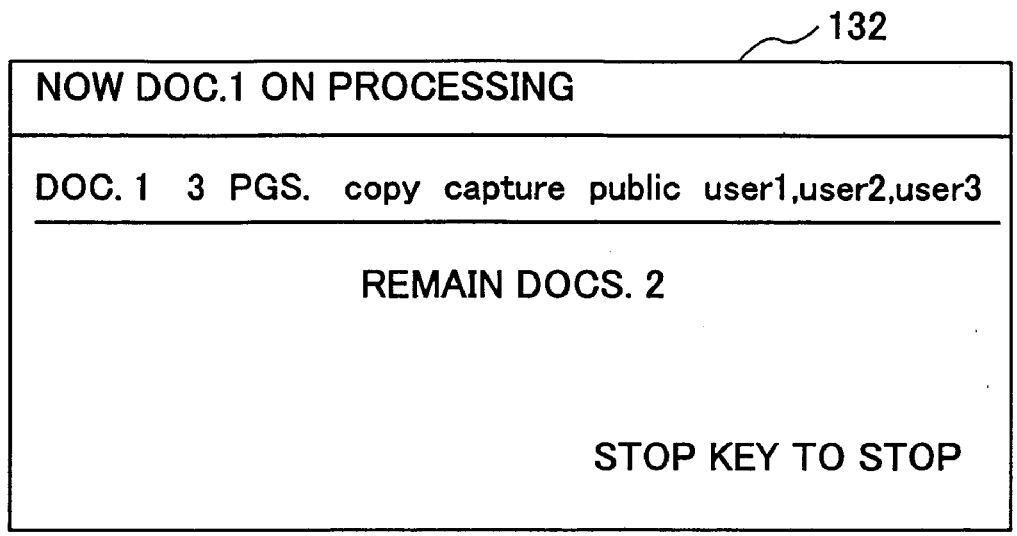
FIG. 10 shows a on-processing picture of the LCD of the operation panel.

In the step P7, it is determined that the document has ended, the document information set previously for the document is added to the image information, and the thus-obtained record is transmitted to the IMS 113 (However, when the above-mentioned storage denial is set for the document, this record is prevented from being transmitted). In a step P8, it is determined whether or not processing for all the documents has finished. When it has not finished, the processing starting from the step P4 is performed again. During processing of documents, an on-processing picture shown in FIG. 10 is displayed on the LCD 132. In the picture, the document information of the currently processed document and the number of remaining (not-yet scanned) documents are displayed.

Further, through the MFP 10, a user can cause the document information of the already read plurality of documents to be displayed on the LCD 132, and can confirm the thus-displayed document information, or can select any document, and correct document information such as the owner information of the selected document if necessary. The CPU 11, based on the thus-performed setting, makes a control such that the image information already read in through photocopying operation or facsimile transmission operation can be stored for each document.

Figure 11:
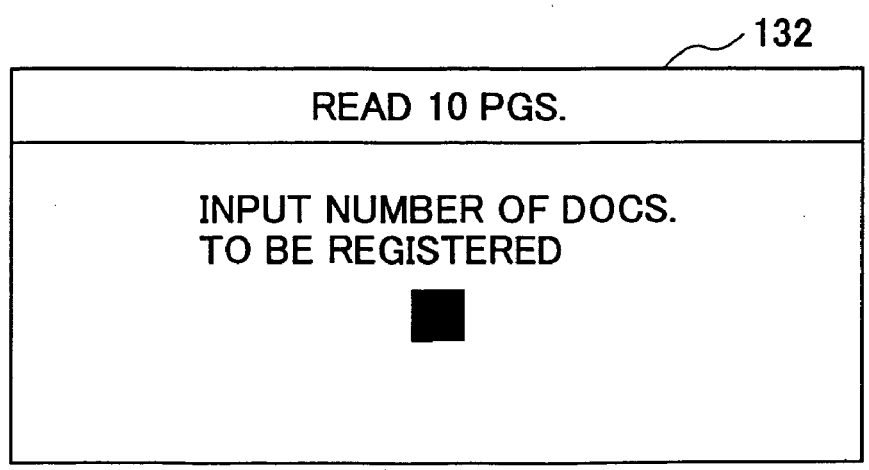
FIG. 11 shows a second example of the initial picture of the LCD of the operation panel.
Figure 12:
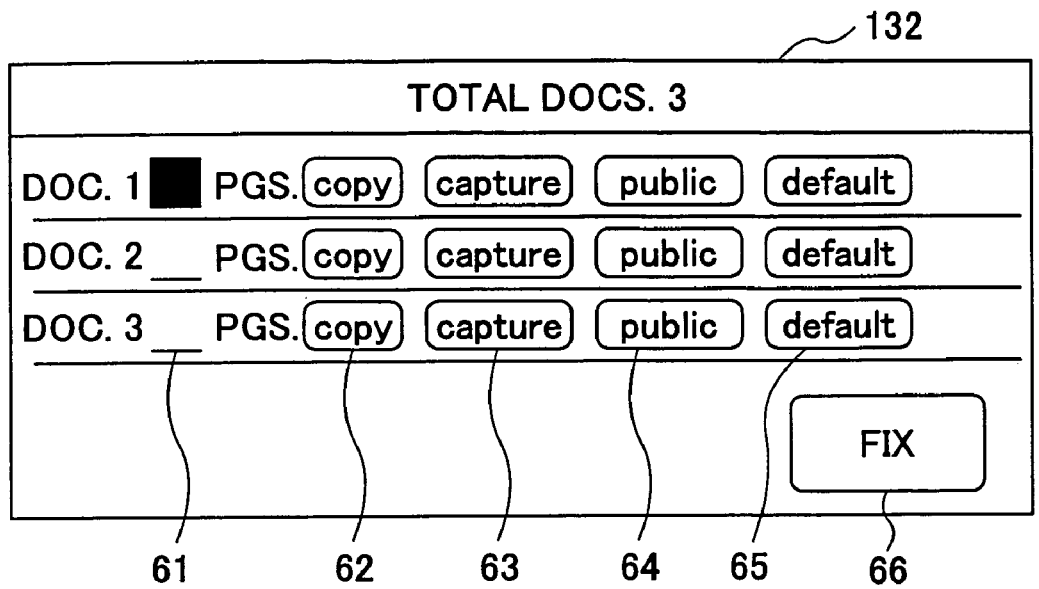
FIG. 12 shows a third example of the setting picture of the LCD of the operation panel.

Specifically, a case where a plurality of documents each including a plurality of sheets are copied will now be described. First, an ordinary operation for photocopying is performed on the MFP 10 by a user. Then, after the photocopying process is executed by MFP 10, when the user presses the document key 134 of the function selection keys 133 of the operation panel 131, the document setting picture shown in FIG. 11 is displayed on the LCD 132, where the number of sheets which have been processed (copied) is displayed as the number of already read sheets. Here, the picture inquires the user to input the total number of documents to be registered. Then, the user may input the total number of documents using the ten keys 135. Thereby, the setting of the thus-input number of documents is displayed as shown in FIG. 12.

Figure 13:
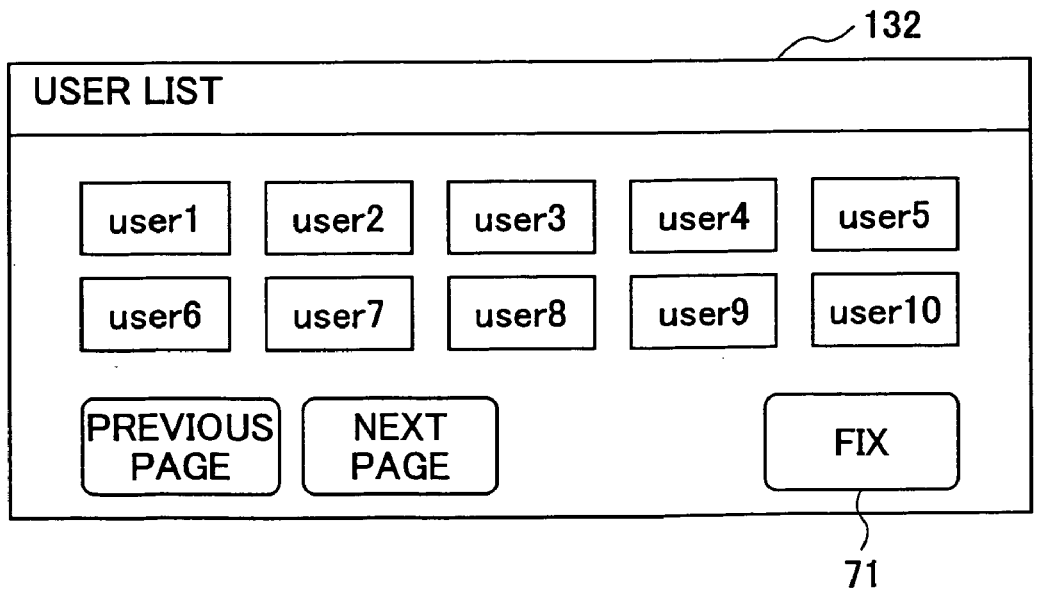
FIG. 13 shows a fourth example of the setting picture of the LCD of the operation panel.

Then, only matters different from the above-described operations in the specific example will now be described. In the initial picture of the document setting picture shown in FIG. 12, the cursor 61 appears as shown in the figure. Then, the number of sheets for each document is input using the ten keys 135. Then, as a result of the processing content key 62 in the document setting picture being touched, the display of this key changes in a toggle manner as mentioned above. When the owner specification key 65 is touched, the user list shown in FIG. 13 is displayed. Further, when the fix key in the document setting picture shown in FIG. 12 is pressed, the document information is added to the corresponding image data for the thus-set document, and the thus-obtained record is transmitted to the IMS 113.

Similarly, another case (due to setting made by a user through a predetermined setting operation or the like) where a plurality of documents are copied through the MFP 10 will now be described. First, the original is set on the original table 23a of the ADF 23, and an ordinary operation for a photocopying process is performed on the MFP 10 by a user. Then, after the photocopying process is finished by the MFP 10, the document setting picture shown in FIG. 12 is displayed, automatically, or in response to user's pressing of the document key 134 of the function selection keys 133 of the operation panel 131. In this case, the document information temporarily set by the CPU 11 is displayed on the document setting picture. A condition for determining separation of documents for temporarily setting the number of sheets of each document of the document setting picture is, for example, a case where the processing contents of photocopying processing, facsimile transmission processing or scanning processing are changed to one another, a time of change between use/non-use of the ADF 23, a time of the start key being pressed, or the like, for example. The method described above with reference to FIG. 3 can also be used for determining the separation of the documents.

In this case, default conditions are set as the other document information. When the separation of the documents and other document information temporarily set by the CPU 11 and displayed are correct, the user should merely press the fix key 66. When any correction is needed for the displayed document information, items to be corrected are selected, and changes are made in a manner similar to that described above in the specific example.

Then, similarly, another case where a plurality of documents are photocopied will now be described. Before photocopying process is performed by the MFP 10, a user performs registration for the plurality of documents. Then, the original is set on the original table 23a of the ADF 23, and the ordinary operation for photocopying process is performed on the MFP 10 by the user. Then, after the photocopying process is performed by the MFP 10, the user presses the document key 134 of the function selection key 133, the document setting picture shown in FIG. 12 is displayed, where the document information previously set before the photocopying process is displayed. Then, the user corrects the document information if necessary through a procedure similar to the above-described specific example by touching an item to be corrected.

The method of determining separation of documents performed by the MFP 10 may be, previously or during the processing, selected from the method shown in FIG. 3, the method through manual setting by a user, the method of automatically determining an end of a document by another condition mentioned above, and so forth, and switched there between, appropriately, by a predetermined setting operation performed by a user.

Figure 14:
FIG. 14 shows one example of the contents of a record of image data provided by the present invention.

FIG. 14 shows an example of the record of image data provided by the MFP 10. As shown in the figure, each record includes image data for a respective document, and corresponding document information such as reading conditions, user information, storage information and so forth (including the contents shown in FIG. 7 and so forth) are added thereto. The document information is, as described with reference to FIGS. 7 and 8, set by a user, temporarily set by the CPU 11, or the contents of temporary setting is checked by a user and are corrected if necessary.

As a specific example, the reading conditions include a size of copying paper, a size of original, a size-changing rate, a pixel density and so forth. The user information includes, as mentioned above, public or non-public mentioned above, user (owner) specification also mentioned above, and so forth. The storage information includes a file list (a list of files (images) included in the document), log information (processing time/date, existence/absence of error, and so forth) and so forth.

Thus, by specifying the number of documents, and the number of sheets included in each document before a reading process, it is possible to accurately determine separation of documents even in a case where sheets read in the above-mentioned feeding mode and those read in the above-mentioned placement mode are mixed in one document, and, also in a case where a plurality of documents are continuously read. Accordingly, it is possible to perform management in units of documents accurately in the storage device, and, thereby, at a time of re-using the stored image data, it is possible to search for and read it with higher accuracy. Further, by the document setting picture, it is possible to set and display document information such as reading conditions, user information, storage information and so forth in detail, totally, before a reading process. Accordingly, operations of setting a user (owner) and confirming the setting can be easily performed. Furthermore, by displaying the contents of a currently processed document and the number of remaining documents during the reading process, it is possible to previously prevent erroneous processing from occurring.

Further, by setting the number of documents, and the number of sheets included in each document after a reading process, it is possible to accurately determine separation of documents even in a case where sheets read in the above-mentioned feeding mode and those read in the above-mentioned placement mode are mixed in one document, and, also in a case where a plurality of documents are continuously read. Accordingly, it is possible to perform management in units of documents accurately in the storage device, and, thereby, at a time of re-using the stored image data, it is possible to search for and read it with higher accuracy.

Further, by automatically setting temporary document separation and setting default document information during a reading process or after the reading process, it is possible to reduce a load on a user to set detailed document information for each document.

Furthermore, it is possible to confirm and correct the set information on the display device after a reading process. Accordingly, when a user finds error in setting of document separation and/or other document information and/or correction is necessary, it is possible to perform correction appropriately, and, thereby, it is possible to set document separation and other document information accurately. As a result, at a time of re-using stored documents, it is possible to search for and read out them with high accuracy.

The present invention is not limited to the above-described embodiment, and variations and modifications may be made without departing from the scope of the present invention.

The present application is based on Japanese priority applications Nos. 11-348366 and 2000-051857, filed on Dec. 8, 1999 and Feb. 28, 2000, respectively, the entire contents of which are hereby incorporated by reference.

What is claimed is:

1. An image reading apparatus comprising:
   a reading part configured to read an original;
   a time measuring part configured to measure different times selectively; and
   a defining part configured to determine a time between reading successive sheets of the original read by said reading part,
   wherein said time measuring part selects a time to be measured according to a predetermined condition, and said defining part determines whether sheets of the original are part of a same document based on the time between reading the successive of sheets of the original and whether the selected time has elapsed without an operation concerning a reading operation being re-started after the reading operation of said reading part is once stopped.

2. The image reading apparatus as claimed in claim 1, wherein said predetermined condition comprises a condition of using the apparatus.

3. The image reading apparatus as claimed in claim 2, wherein said condition of using the apparatus comprises a function of the apparatus which is executed by reading the original.

4. The image reading apparatus as claimed in claim 3, wherein said function of the apparatus is at least one of a facsimile transmission function, a photocopying function and a scanning function.

5. The image reading apparatus as claimed in claim 2, wherein said condition of using the apparatus is either one of a case where an automatic original feeding function is used and a case where the automatic original feeding function is not used and a user manually feeds the original.

6. The image reading apparatus as claimed in claim 5, wherein the time measured by the time measuring part is set to be shorter in the case where the automatic original feeding function is used compared to the case where a user manually feeds the original.

7. The image reading apparatus as claimed in claim 5, wherein, when operation of changing from a condition in which the automatic original feeding function is used to a condition in which the original is fed manually is detected during the measurement of the time of the case of using the automatic original feeding function by said time measuring part, said defining part determines that the measurement has finished even during the measurement of said time.

8. The image reading apparatus as claimed in claim 5, wherein, when an operation of again manually feeding the original is detected during measurement of the time of the case of manually feeding the original by said time measuring part, said time measuring part restarts the measurement of said time.

9. The image reading apparatus as claimed in 1, wherein measurement of the time by said time measuring part is stopped by a predetermined operation.

10. The image reading apparatus as claimed in claim 1, further comprising a registering part for previously registering, for the original to be read, an indication of the original as a plurality of documents,
wherein image data read by said reading part from the original is treated as respective ones of the plurality of documents registered by said registering part.

11. The image reading apparatus as claimed in claim 10, wherein said registering part is used for registering document information for each of the plurality of documents, and adds the document information to the image data for each document.

12. The image reading apparatus as claimed in claim 11, wherein the document information comprises at least one of a reading condition, user information and storage information.

13. The image reading apparatus as claimed in claim 10, further comprising a display part displaying the contents registered by said registering part during the reading operation by said reading part.

14. The image reading apparatus as claimed in claim 10, further comprising:
a display part displaying the contents registered by said registering part after the reading operation by said reading part; and
a confirming/editing part for confirming/editing the registered contents viewing them displayed by said displaying part.

15. The image reading apparatus as claimed in claim 1, treating one or a plurality of sheets of original as one document, comprising:
a display part displaying contents comprising separation of sheets of the original determined by said time measuring part and defining part to be part of a same document, as temporary registered contents; and
a confirming/editing part for confirming/editing the temporary registered contents viewing them displayed by said displaying part.

16. The image reading apparatus as claimed in claim 15, wherein said confirming/editing part is used for registering document information for each document, and adding the document information to the image data for each document.

17. The image reading apparatus as claimed in claim 16, wherein the document information comprises at least one of a reading condition, user information and storage information.

18. An image reading method comprising:
a) reading an original;
b) measuring different times selectively; and
c) determining a time between reading successive sheets of the original read by said reading a),
wherein said measuring b) selects a time to be measured according to a predetermined condition, and said determining c) determines whether sheets of the original are part of a same document based on time between reading the successive sheets of the original and whether the selected time has elapsed without an operation concerning a reading operation being restarted after the reading operation of said step a) is once stopped.

19. The image reading method as claimed in claim 18, wherein said predetermined condition comprises a condition of using an apparatus to be used.

20. The image reading method as claimed in claim 19, wherein said condition of using the apparatus comprises a function of the apparatus which is executed by reading the original.

21. The image reading method as claimed in claim 20, wherein said function of the apparatus is at least one of a facsimile transmission function, a photocopying function and a scanning function.

22. The image reading method as claimed in claim 19, wherein said condition of using the apparatus is either one of a case where an automatic original feeding function is used and a case where the automatic original feeding function is not used and a user manually feeds the original.

23. The image reading method as claimed in claim 22, wherein the time measured by said measuring b) is set to be shorter in the case where the automatic original feeding function compared to the case where a user manually feeds the original.

24. The image reading method as claimed in claim 22, wherein, when operation of changing from a condition in which the automatic original feeding function is used to a condition in which the original is fed manually is detected during the measurement of the time of the case of using the automatic original feeding function by measuring b), said determining c) determines that the measurement has finished even during the measurement of said time.

25. The image reading method as claimed in claim 22, wherein, when an operation of again manually feeding the original is detected during measurement of the time of the case of manually feeding the original by said measuring b), said measuring b) re-starts the measurement of said time.

26. The image reading method as claimed in 18, wherein measurement of the time by said measuring b) is stopped by a predetermined operation.

27. The image reading method as claimed in claim 18, further comprising d) previously registering, for the original to be read, an indication of the original as a plurality of documents,
wherein image data read by said reading a) from the original is treated as respective ones of the plurality of documents registered by said previously registering d).

28. The image reading method as claimed in claim 27, wherein said previously registering d) registers document information for each of the plurality of documents, and adds the document information to the image data for each document.

29. The image reading method as claimed in claim 28, wherein the document information comprises at least one of a reading condition, user information and storage information.

30. The image reading method as claimed in claim 27, further comprising e) displaying the contents registered by said previously registering d) during the reading operation by said reading a).

31. The image reading method as claimed in claim 27, further comprising:
e) displaying the contents registered by said previously registering d) after the reading operation by reading a); and f) confirming/editing the registered contents viewing them displayed by said displaying e).

32. The image reading method as claimed in claim 18, treating one or a plurality of sheets of original as one document, comprising:
   d) displaying contents comprising of sheets of the original determined by said measuring b) c) determining to be part of a same document, as temporary registered contents of the same document; and
   e) confirming/editing the temporary registered contents viewing them displayed by said displaying d).

33. The image reading method as claimed in claim 32, wherein said confirming/editing e) registers document information for each document, and adds the document information to the image data for each document.

34. The image reading method as claimed in claim 33, wherein the document information comprises at least one of a reading condition, user information and storage information.

* * * * *